US011161290B2

(12) United States Patent
Okabe et al.

(10) Patent No.: US 11,161,290 B2
(45) Date of Patent: Nov. 2, 2021

(54) METHOD FOR MANUFACTURING IMPELLER

(71) Applicant: MITSUBISHI HEAVY INDUSTRIES, LTD., Tokyo (JP)

(72) Inventors: Ryoji Okabe, Tokyo (JP); Yasunori Watanabe, Tokyo (JP); Kosuke Ikeda, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 276 days.

(21) Appl. No.: 15/544,457

(22) PCT Filed: Nov. 12, 2015

(86) PCT No.: PCT/JP2015/005652
§ 371 (c)(1),
(2) Date: Jul. 18, 2017

(87) PCT Pub. No.: WO2016/147231
PCT Pub. Date: Sep. 22, 2016

(65) Prior Publication Data
US 2018/0029273 A1 Feb. 1, 2018

(30) Foreign Application Priority Data

Mar. 17, 2015 (JP) .............................. JP2015-052792

(51) Int. Cl.
*B29C 45/73* (2006.01)
*F04D 29/02* (2006.01)
(Continued)

(52) U.S. Cl.
CPC .......... *B29C 45/73* (2013.01); *B29C 45/0005* (2013.01); *B29C 45/78* (2013.01);
(Continued)

(58) Field of Classification Search
CPC ..... B29C 45/7337; B29C 45/73; B29C 45/78; B29C 2945/76531; B29C 2045/7343; B29L 2031/7504; F05D 2300/603
See application file for complete search history.

(56) References Cited

U.S. PATENT DOCUMENTS 4,973,242 A * 11/1990 Tsukada ................ B29C 45/261
249/105
6,017,209 A * 1/2000 Gellert ................ B29C 45/2711
425/549

(Continued)

FOREIGN PATENT DOCUMENTS

JP  H03267599  * 11/1991
JP  7-71201 A  3/1995
(Continued)

OTHER PUBLICATIONS

Japanese Office Action for JP Patent Application No. 2015-052792 drafted Jul. 4, 2017.
(Continued)

*Primary Examiner* — Alison L Hindenlang
*Assistant Examiner* — Debjani Roy
(74) *Attorney, Agent, or Firm* — Birch, Stewart, Kolasch & Birch, LLP

(57) ABSTRACT

The present invention prevents internal cracks occurring when an impeller molded using a fiber reinforced resin is manufactured by injection molding. This method for manufacturing an impeller is provided with: an injection step of filling a cavity with a molten resin containing reinforced fibers, from a gate side into which the molten resin flows, toward an opposite-gate side opposite to the gate side; and a dwell step of applying required pressure to the filled molten resin. In the injection step and the dwell step, directional cooling is performed with a temperature gradient such that the temperature becomes lower from the gate side (Continued)

toward the opposite-gate side. According to this method for manufacturing the impeller, the opposite-gate side shrinks with a decrease in the temperature of the molten resin since the temperature of the opposite-gate side is lower. Meanwhile, because the temperature on the gate side is increased, the molten resin can be replenished from the gate side so as to correspond to the amount of shrinkage on the opposite-gate side, and therefore the occurrence of internal tensile residual stress and cracks due to the shrinkage can be prevented.

20 Claims, 10 Drawing Sheets

(51) Int. Cl.
*B29C 45/78* (2006.01)
*B29C 45/00* (2006.01)
*F04D 29/28* (2006.01)
*B29K 101/12* (2006.01)
*B29L 31/00* (2006.01)
*F02B 37/00* (2006.01)

(52) U.S. Cl.
CPC ........... *F04D 29/02* (2013.01); *F04D 29/023* (2013.01); *F04D 29/284* (2013.01); *B29C 2045/7343* (2013.01); *B29C 2945/76531* (2013.01); *B29K 2101/12* (2013.01); *B29L 2031/7504* (2013.01); *F02B 37/00* (2013.01); *F05D 2220/40* (2013.01); *F05D 2300/603* (2013.01)

(56) References Cited

U.S. PATENT DOCUMENTS

| | | | |
|---|---|---|---|
| 6,503,456 B1 * | 1/2003 | Knebel | ............... B01L 3/50851 422/553 |
| 2006/0246166 A1 * | 11/2006 | Hsu | ......... B29C 35/16 425/143 |
| 2008/0054527 A1 * | 3/2008 | Kang | .................. B29C 45/2602 264/327 |
| 2009/0035495 A1 * | 2/2009 | Iyoda | .................. B29C 33/0066 428/34.1 |
| 2012/0148699 A1 * | 6/2012 | Cho | ........................ B29C 45/73 425/143 |

FOREIGN PATENT DOCUMENTS

| | | |
|---|---|---|
| JP | 2667544 B2 | 10/1997 |
| JP | 3018853 B2 | 3/2000 |
| JP | 2000-225629 A | 8/2000 |
| JP | 2002-273771 A | 9/2002 |

OTHER PUBLICATIONS

International Preliminary Report on Patentability and English translation of the Written Opinion of the International Searching Authority (Forms PCT/IB/338, PCT/IB/373 and PCT/ISA/237) for Application No. PCT/JP2015/005652, dated Sep. 28, 2017.

* cited by examiner

METHOD FOR MANUFACTURING IMPELLER

TECHNICAL FIELD

The present invention relates to a method for manufacturing an impeller made of a fiber reinforced resin through injection molding.

BACKGROUND ART

At the beginning, turbochargers (turbine type turbochargers) to be mounted on commercially available passenger cars were mainly aimed at increasing the output of engines with relatively large displacement.

However, in order to compensate for the output of engines with small displacement while a trend towards automobiles with small displacement increases from a viewpoint of environmental protection, demand for turbochargers is increasing. Among them, reduction of so-called turbo lag peculiar to turbo engines car is desired.

In order to reduce a turbo lag, it is effective to reduce the weight of impellers of turbochargers to reduce an inertia moment. Up to now, adoption of a ceramic material capable of markedly realizing weight reduction compared to a metallic material and also adoption of fiber reinforced resin as disclosed in PTLs 1 and 2 have been studied.

CITATION LIST

Patent Literature

[PTL 1] Japanese Patent No. 2667544
[PTL 2] Japanese Patent No. 3018853

SUMMARY OF INVENTION

Technical Problem

Although injection molding is used for manufacturing the impellers using the fiber reinforced resin, the impellers have complicated shapes, and reinforced fibers are contained in the resin. Therefore, it is not easy to obtain sound molded products through the injection molding. As one factor of being sound molded products, it is necessary that the insides of the entire molded products are precise. However, it is known that cracks occur in thick portions of injection-molded products. Thus, an object thereof is to suppress the occurrence of internal cracks when an impeller made of a fiber reinforced resin is manufactured through injection molding.

Solution to Problem

The invention relates a method for manufacturing an impeller by performing injection-molding into a cavity of a mold, the impeller including a hub having a front side and a back side and having a boss with a boss hole formed along a rotational axis of the impeller, and a plurality of blades provided on the front side of the hub and being made of a resin having reinforced fibers dispersed therein.

This manufacturing method includes an injection step of filling the cavity with a molten resin containing the reinforced fibers, in a direction of the rotational axis and from a gate side into which the molten resin flows, toward an opposite-gate side opposite to the gate side; and a dwell step of applying required pressure to the filled molten resin. In the injection step and the dwell step, directional cooling is performed with a temperature gradient such that the temperature becomes relatively lower from the gate side toward the opposite-gate side.

According to the method for manufacturing an impeller of the invention, since the temperature of the opposite-gate side is lower, shrinkage accompanying a decrease in the temperature of the molten resin occurs in such a manner that the opposite-gate side precedes. Meanwhile, since the temperature of the gate side is made relatively high, the molten resin can be replenished from the gate side so as to correspond to the amount of shrinkage on the opposite-gate side, and therefore the occurrence of internal tensile residual stress and cracks due to the shrinkage can be prevented.

In the injection step of the invention, as a specific technique for realizing the directional cooling, an inflow passage of the molten resin leading to the cavity, and the gate of the cavity, and its vicinity region can be heated from peripheries thereof, while the cavity can be cooled from a periphery thereof.

In the dwell step of the invention, it is preferable that the gate of the cavity that has been heated until then, that is, the gate of the heated cavity and its vicinity region are cooled.

Additionally, in the dwell step of the invention, it is preferable that keeping of injection pressure is performed until the cooling of the gate is started.

Additionally, in the dwell step of the invention, it is preferable that keeping of the temperature of the molten resin in the vicinity of the gate is continued in a temperature zone between a melting point and a glass transition temperature of the resin.

Additionally, in the dwell step of the invention, it is preferable that the injection pressure is performed at 100 MPa or more, and it is preferable that the injection pressure is performed at 140 MPa or more.

Additionally, in the dwell step of the invention, it is preferable that a pin through which cooling water is circulated is inserted into a location corresponding to the boss hole, and cooling is also performed from the center of the cavity.

In this case, it is preferable that the pin is inserted from the front side and a tip thereof is arranged to be retracted from the back side of the boss to the front side thereof, in a case where the molten resin is injected in a first direction directed from the back side to the front side. Additionally, it is preferable that the pin is inserted from the back side and the tip thereof is arranged to be retracted from the front side of the boss to the back side thereof, in a case where the molten resin is injected in a second direction directed from the front side to the back side. Even in any case, the tip of the pin stops inside a product part cavity, especially, inside a maximum diameter position.

Advantageous Effects of Invention

According to the method for manufacturing an impeller of the invention, since the temperature of the opposite-gate side is lower, shrinkage accompanying a decrease in the temperature of the molten resin occurs on the opposite-gate side. Meanwhile, since the temperature of the gate side is made relatively high, the molten resin can be replenished from the gate side so as to correspond to the amount of shrinkage on the opposite-gate side, and therefore the occurrence of internal tensile residual stress and cracks due to the shrinkage can be prevented.

DESCRIPTION OF EMBODIMENTS

Hereinafter, this invention will be described in detail with reference to embodiments illustrated in the accompanying drawings.

Figure 10:
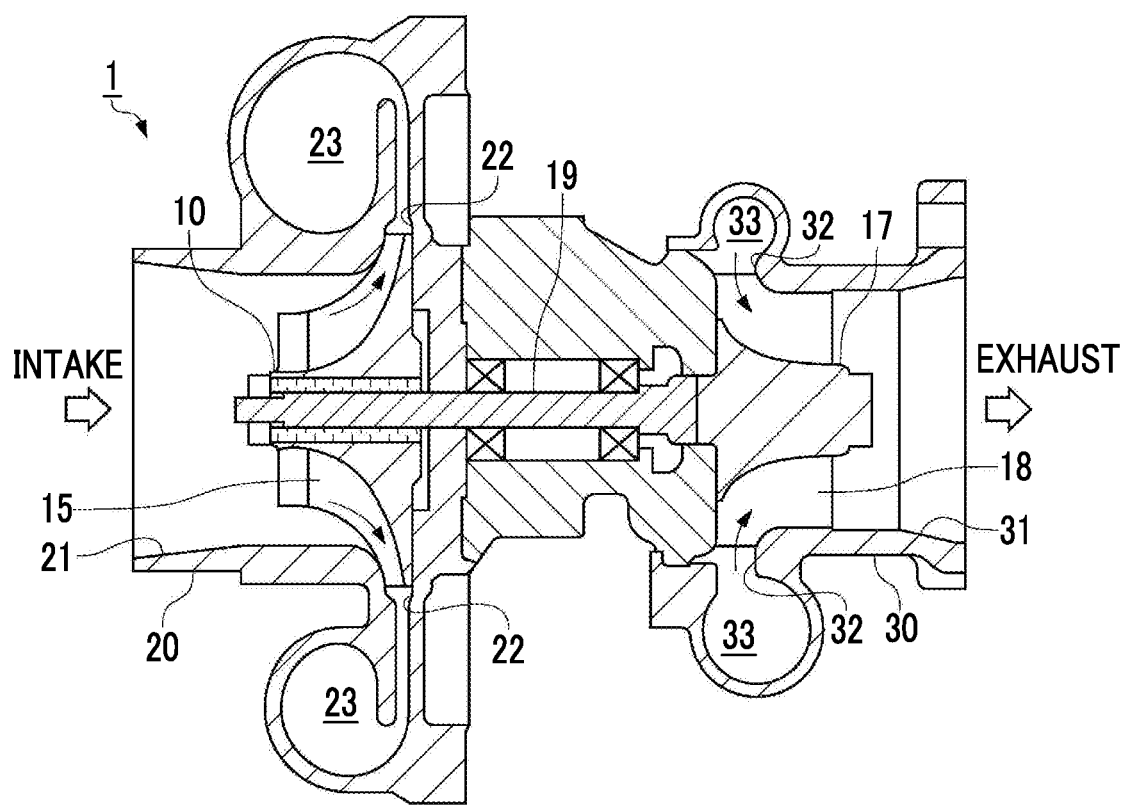
FIG. 10 is a longitudinal sectional view illustrating a turbocharger to which the impeller of the present embodiment is applied.

An impeller related to the present embodiment is applied to a turbocharger 1 as illustrated in FIG. 10.

The turbocharger 1 includes a turbine impeller 17 that rotates by receiving exhaust gas, and a compressor impeller 10 that performs intake and compression through rotation following the turbine impeller 17 and feeds the exhaust gas into a cylinder of an engine (not illustrated).

The compressor impeller 10 and the turbine impeller 17 are coupled together so as to rotate integrally by a shaft 19 rotatably journalled inside the turbocharger 1.

The compressor impeller 10 is housed inside a compressor housing 20.

The compressor housing 20 includes an intake port 21 for introducing intake gas on a front side of the compressor impeller 10, and a compressor passage 23, which extends spirally, at an outer periphery of the compressor impeller 10. The compressor passage 23 is connected to a discharge port 22 opening to an outer peripheral portion of the compressor impeller 10.

The turbine impeller 17 is housed inside a turbine housing 30.

The turbine housing 30 includes a scroll passage 33, which extends spirally, at an outer periphery of the turbine impeller 17. The exhaust gas exhausted from an internal combustion engine (not illustrated) is introduced into the scroll passage 33, the exhaust gas that has obtained a rotative force in the process of passing through the scroll passage 33 is blown against a turbine blade 18 of the turbine impeller 17 through an introduction inlet 32 formed in an inner surface of the scroll passage 33, as illustrated by an arrow in FIG. 10. In this way, the turbine impeller 17 is rotated by the exhaust gas blown. In addition, the exhaust gas blown against the turbine impeller 17 is discharged through a discharge port 31 opening to a front side of the turbine impeller 17.

If the rotation of the turbine impeller 17 is transmitted through the shaft 19 and the compressor impeller 10 is rotated, intake gas is sucked through the intake port 21. The sucked intake gas is compressed by a compressor blade 15 provided in the compressor impeller 10, and is forcibly fed into the compressor passage 23 through the discharge port 22. The intake gas fed into the compressor passage 23 is fed to the cylinder (not illustrated) of the internal combustion engine where turbocharging is performed.

The compressor impeller 10 related to the present embodiment has a feature in that the compressor impeller is formed by injection-molding a fiber reinforced resin. First, a schematic configuration of the compressor impeller 10 will be described.

Figure 1A:
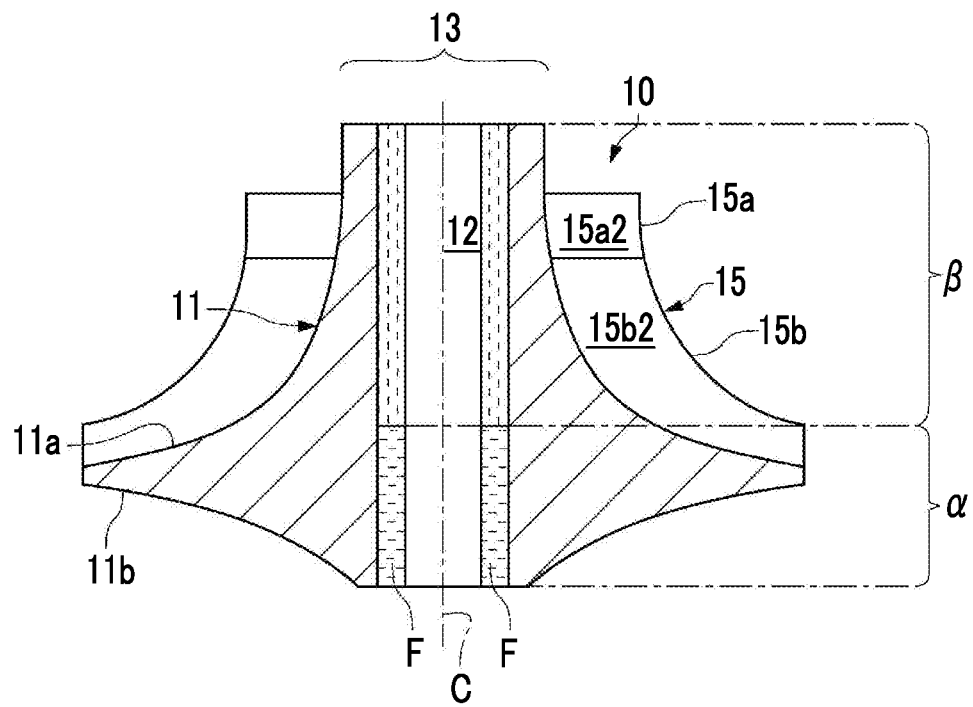
FIG. 1A illustrates a longitudinal section of an impeller related to the present embodiment.

As illustrated in FIG. 1A, the compressor impeller 10 includes a disk-like hub 11 that is provided coaxially with the shaft 19 illustrated in FIG. 10, and a plurality of the blade-shaped compressor blades 15 that rise from one surface side of the hub 11, respectively, and form flow paths for intake gas. In addition, in the compressor impeller 10, a side where the compressor blades 15 are provided is defined as a front surface 11a, and its opposite side is defined as a back surface 11b. Additionally, in the compressor impeller 10, a side near a rotational axis C is referred to as an internal diameter side, and a side far from the rotational axis is referred to as an external diameter side.

The hub 11 is curved such that the front surface 11a protrudes continuously from the external diameter side toward the internal diameter side. The hub 11 includes a boss hole 12 into which the shaft 19 is fitted, and a boss 13 that surrounds the rotational axis C of the compressor impeller 10 is provided around the boss hole 12.

The compressor blades 15 include two types of a long blade 15a and a short blade 15b, in the present embodiment, and the long blade 15a and the short blade 15b are alternately arrayed.

The compressor impeller 10 is formed of the fiber reinforced resin, and has particularly a feature in the orientation of reinforced fibers F in the boss 13.

In order to form the compressor impeller 10 using the fiber reinforced resin, molten resin containing the reinforced fibers is injected along the rotational axis C. Since the reinforced fibers F are oriented in an ejection direction in a so-called skin layer around the boss hole 12, the reinforced fibers F are oriented in the rotational axis C as they are.

However, the compressor impeller 10 according to the present embodiment includes two portions with different orientation directions, as portions corresponding to the skin layer of the boss 13 surrounding the periphery of the boss hole 12. That is, as taken in a section in a direction of the rotation axis, as illustrated in FIG. 1A, the present embodiment includes an orientation region where the reinforced fibers F (hereinafter, a first region α) are inclined with respect to a radial direction of the boss 13 (hub 11), and an orientation region (hereinafter, a second region β) where the reinforced fibers F runs along the rotational axis C of the boss 13 (hub 11).

Generally, although the fiber reinforced resin has high mechanical strength (for example, tensile strength) with respect to the same direction as a direction in which reinforced fibers are oriented, the fiber reinforced resin has low mechanical strength with respect to a direction orthogonal to the orientation direction of the reinforced fibers.

Figure 1B:
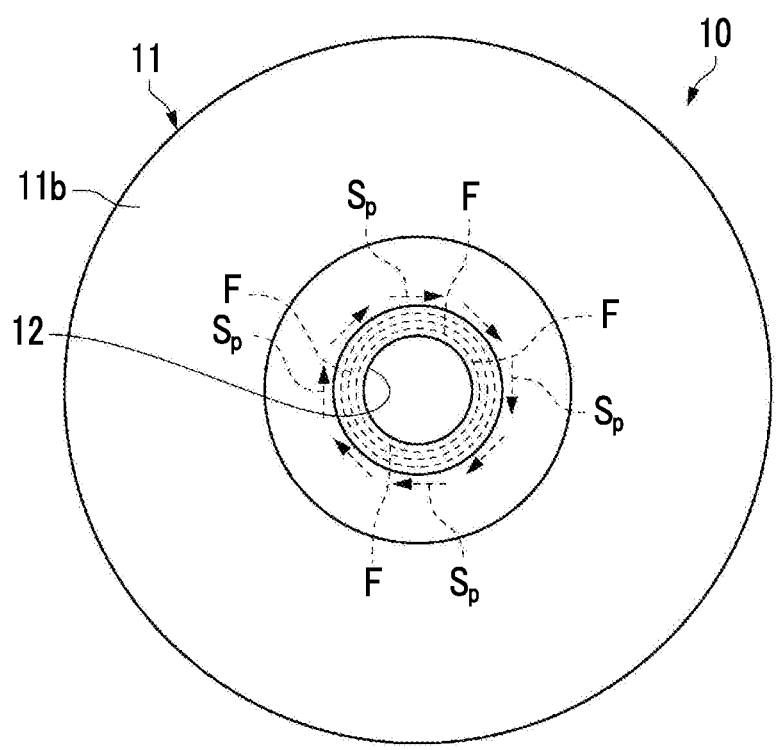
FIG. 1B illustrates a back view of an impeller related to the present embodiment.

While the compressor impeller 10 is rotating, as illustrated in FIG. 1B, a principal stress $S_P$ is generated in a circumferential direction in the portion of the boss 13 of the compressor impeller 10. Particularly, in the first region α, the external diameter of the hub 11 is large and the thickness thereof is large. Therefore, a large principal stress $S_P$ is generated compared to the second region β. Thus, in order to forcibly cope with the principal stress $S_P$ resulting from the rotation, strength against the principal stress $S_P$ is secured by orienting the reinforced fibers F in an inclined manner with respect to the radial direction as in the first region α. The first region α includes the position in the direction of the rotational axis C in which the external diameter of the hub 11 is maximized.

Meanwhile, the compressor impeller 10 is fixed by fastening using bolts, and a compressive stress along the rotational axis C is generated in the portion of the boss 13 by this fastening. In the second region β, in order to give higher priority to coping with this compressive stress than the principal stress $S_P$, the reinforced fibers F are oriented in the second region β so as to run along the rotational axis C.

Figure 2A:
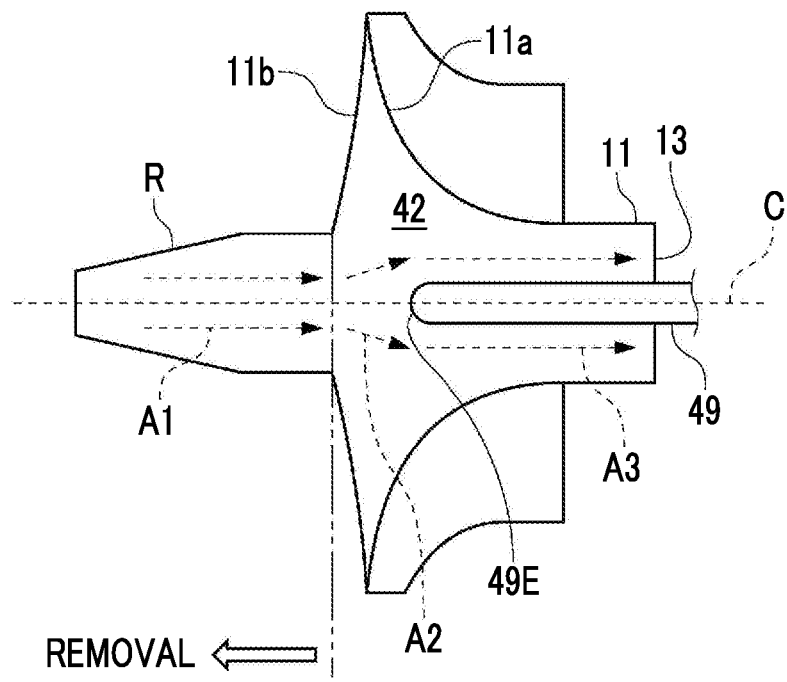
FIG. 2A is a view illustrating a technique of obtaining a first region related to the present embodiment.
Figure 2B:
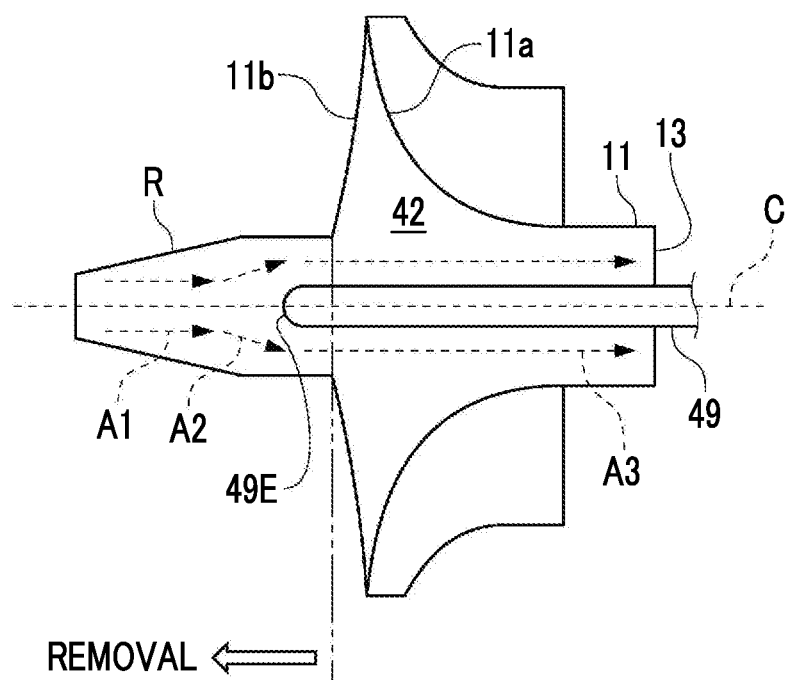
FIG. 2B is a view illustrating a technique of obtaining a second region related to the present embodiment.

Since the reinforced fibers F are oriented along the rotational axis C if the molten resin containing the reinforced fibers is injected along the rotational axis C, it can be said that it is relatively easy to obtain the second region β, but special treatment is required to obtain the first region α. Hereinafter, description will be made with reference to FIG. 2A and FIG. 2B. In addition, although FIG. 2A and FIG. 2B illustrate the external diameter of a cavity 42 and a sprue R for molding the compressor impeller 10, sites corresponding to the compressor impeller 10 are designated by reference signs in the compressor impeller 10 for the sake of explanation.

In the present embodiment, when the compressor impeller 10 is injection-molded, a flow of the molten resin in which the reinforced fibers F are oriented in an inclined manner with respect to the radial direction of the boss 13 is caused in a region corresponding to the first region α. Specifically, in the present embodiment, the length of a center pin 49 arranged corresponding to the boss hole 12 is specified in the midst of injection molding. Hereinafter, specific description will be made as compared to FIG. 2A and FIG. 2B. In addition, FIG. 2A relates to the present embodiment, and a tip 49E of the center pin 49 stops at a position where the center pin 49 has shifted by a predetermined dimension from the back surface 11b to the front surface 11a side without passing through the boss 13. The tip 49E stops inside the cavity 42 corresponding to the compressor impeller 10 that is a molded product, particularly, at a position where the diameter thereof is maximized. In contrast, in FIG. 2B, the center pin 49 is provided through the boss 13 at the direction of the rotational axis C. In addition, in FIG. 2A and FIG. 2B, arrows A1 to A3 illustrated by dashed lines indicate directions in which the molten resin flows. Additionally, the center pin 49 is premised on being inserted from the front surface 11a side of the compressor impeller 10.

Usually, the following is known as the orientation of fibers when the molten resin containing the reinforced fibers is injected into a flat plate-shaped cavity.

Since a shear stress acts on the vicinity of a cavity wall surface of the molten resin in a flow state, that is, in a portion equivalent to the skin layer, the reinforced fibers in the molten resin are oriented in a flow direction of the molten resin. Meanwhile, since no shear stress acts on the vicinity of a center in a thickness direction apart from the cavity wall surface, that is, a portion equivalent to a core layer, the reinforced fibers in the molten resin are oriented in a direction orthogonal to the flow direction of the molten resin. That is, since the reinforced fibers are oriented in the direction orthogonal to the flow direction at a center portion of the thickness of a molded product, there is a phenomenon in which the reinforced fibers are oriented in a width direction in the center portion of the thickness of the flat plate-shaped molded product, and the reinforced fibers are oriented at random within a columnar cross-section in the center portion of the thickness of the columnar molded product. The invention uses this phenomenon.

First, in the example illustrated in FIG. 2A, the fiber in the boss 13 is oriented at random within a cross-section of the rotational axis C because the center pin 49 is not present in the region corresponding to the first region α. In the region corresponding to the second region β, the fibers are oriented in the direction of the rotational axis C around the boss hole 12 due to a shear stress caused by an outer peripheral surface of the center pin 49.

Meanwhile, in the case of FIG. 2B, the fibers are oriented in the direction of the rotational axis C due to the shear stress caused by the outer peripheral surface of the center pin 49 in the region corresponding to the first region α. As a result, it is possible to provide the boss with regions with different fiber orientations according to the position of the tip 49E of the center pin 49.

Here, in FIG. 2A and FIG. 2B, a left side in this drawing by a two-dot chain is the sprue R that is a path for the molten resin, and is removed by machining after the injection molding. That is, an injection molded body that remains as the compressor impeller 10 is a right side in the drawing by a two-dot chain line. Thus, if FIG. 2A and FIG. 2B are compared with each other, in FIG. 2A where the center pin 49 is not passed through, that is, in the present embodiment, a region where the flow of the molten resin runs in the radial direction falls within a range of the compressor impeller 10, and in FIG. 2B where the center pin 49 is not passed through, the region that the flow of the molten resin runs in the radial direction is removed and does not remain in the compressor impeller 10.

As described above, the compressor impeller 10 in which the first region α and the second region β coexist can be obtained by adjusting a depth at which the center pin 49 is inserted.

Figure 3A:
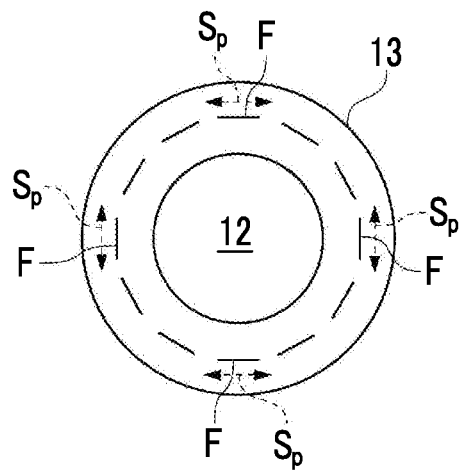
FIG. 3A is a view illustrating an example of orientation of reinforced fibers in the first region related to the present embodiment.

Although an aspect in which the reinforced fibers F illustrated in FIG. 1B and FIG. 3A are oriented in the circumferential direction is an aspect of the most preferable orientation in the first region α, in practice, the invention is not limited to all the reinforced fibers F being oriented in the circumferential direction.

Figure 3B:
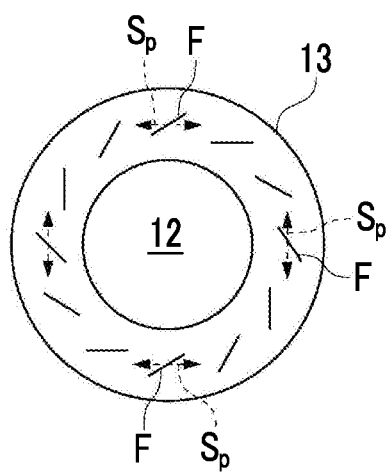
FIG. 3B is a view illustrating an example of orientation of reinforced fibers in the first region related to the present embodiment.
Figure 3C:
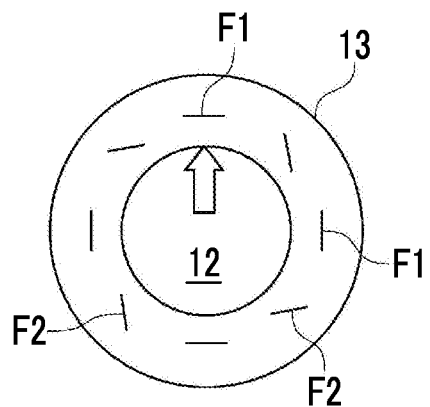
FIG. 3C is a view illustrating an example of orientation of reinforced fibers in the first region related to the present embodiment.

Hence, for example, as illustrated in FIG. 3B, in the cross-section of the boss 13, the reinforced fibers F may not be oriented so as to be inclined with respect to the radial direction of the boss 13. Since the reinforced fibers F intersects the principal stress $S_P$ also in the case of this inclination orientation, the strength against the principal stress $S_P$ can be guaranteed. Additionally, in the present embodiment, as illustrated in FIG. 3C, reinforced fibers F1 that are oriented in the circumferential direction and reinforced fibers F2 that are oriented in an inclined manner may be mixed together, and the present embodiment, orientations including both are referred to as the inclination orientation.

As described above, the invention improves the strength against the principal stress $S_P$ by orienting the reinforced fibers F in the first region α so as to be inclined with respect to the radial direction of the boss 13. Although the angle of this inclination is within a range of more than 0° and equal to or less than 90° (orthogonal), the strength against the principal stress $S_P$ is improved as the inclination angle becomes larger. Thus, the inclination angle is preferably 30° or more, more preferably 50° or more, and still more preferably 70° or more.

Figure 4A:
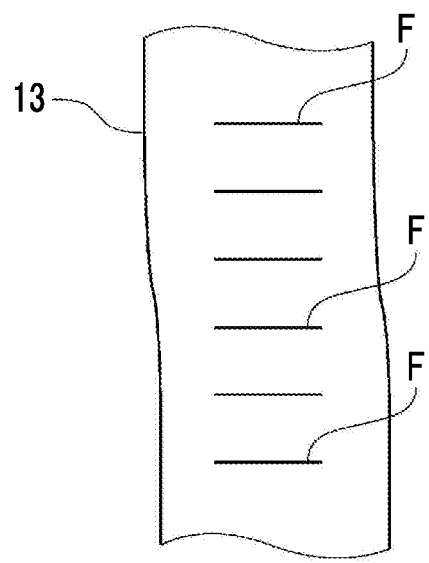
FIG. 4A is a view illustrating an example of orientation of the reinforced fibers in the first region related to the present embodiment.
Figure 4B:
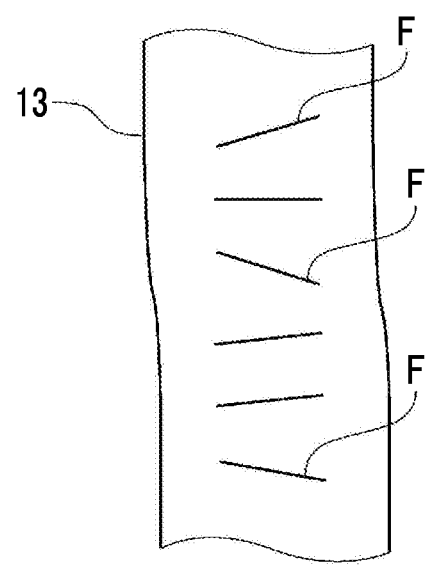
FIG. 4B is a view illustrating an example of orientation of the reinforced fibers in the first region related to the present embodiment.

In the first region α of the invention, for the improvement of the strength against the principal stress $S_P$, it is dominant that the reinforced fibers F in the cross-section of the boss 13 are inclined with respect to the radial direction of the boss 13. The cross-section is referred to as follows. As are illustrated in FIG. 4A, the reinforced fibers F may be oriented so as to be orthogonal to the rotational axis C. Additionally, as illustrated in FIG. 4B, the reinforced fibers F may be oriented so as to be inclined with respect to the rotational axis C.

Although the first region α and the second region β in the present embodiment have been described above, respectively, the orientations of the reinforced fibers F in both the regions are mixed in a boundary portion between the first region α and the second region β. That is, the boss 13 in the present embodiment is constituted with the first region α where the frequency of the reinforced fibers that are oriented in an inclined manner with respect to the radial direction of the hub 11 is high, the second region β where the frequency of the reinforced fibers F that are oriented in the direction of the rotational axis C is high, and a third region which is provided between the first region α and the second region β and in which the reinforced fibers F that are oriented in an inclined manner and the reinforced fibers F that are oriented in the axial direction are mixed.

In the present embodiment, the orientation of the reinforced fibers F of the portion of the hub 11 around the boss 13 is arbitrary. Here, in a region of the fiber reinforced resin closer to the external diameter side than the skin layer, the orientation of the reinforced fibers F becomes random and the reinforced fibers F that are oriented in an inclined manner are considerably contained. Hence, this portion may use this random orientation as it is.

The resin (base material) and the reinforced fibers F that constitute the compressor impeller 10 are arbitrary. Since the base material is subjected to the injection molding, a thermoplastic resin is used. For example, well-known resins, such as general-purpose resins, such as polypropylene and polyethylene, and engineering plastics, such as polyamide and polycarbonate, which have heat resistance, can be used. Additionally, as the reinforced fibers F, well-known fibers, such as well-known reinforced fibers, such as glass fibers and carbon fibers, can be used. In addition, generally, as the rotation of the compressor impeller 10 of the turbocharger increases, the temperature of air to be compressed rises, and thereby, the temperature of the compressor impeller 10 itself also rises. Therefore, it is preferable that the resin constituting the compressor impeller 10 is made of a heat-resistant thermoplastic resin having a suitable glass transition temperature with respect to the arrival temperature of the compressor impeller 10 during the increase in the rotation.

Additionally, the content of the reinforced fibers F is preferably within a range of 5 mass % to 60 mass % and more preferably within a range of 25 mass % to 45 mass %. Although those having the same fiber length can be used as the reinforced fibers F, relatively long reinforced fibers F and relatively short reinforced fibers F can be mixed.

Additionally, in addition to the thermoplastic resin and the reinforced fibers F, a thermoplastic elastomer can be added to the compressor impeller 10. By containing the thermoplastic elastomer, the ductility of the fiber reinforced resin can be improved, the sensitivity to crack generation can be reduced, the compressibility of the molten resin at high pressure during the injection molding can be increased and the amount of expansion enough to compensate for cooling solidification shrinkage can be secured, and this is effective to prevent the occurrence of tensile residual stress and cracks. According to the study of the present inventors, tensile residual stress and cracks can be further reduced by containing the thermoplastic elastomer of 0.1 mass % to 30 mass %.

Additionally, if the thickness of the hub 11 is reduced by providing a recess in the back surface 11b of the hub 11 the absolute value of the amount of shrinkage of the molten resin during the injection molding becomes small. Thus, tensile residual stress and cracks can be reduced.

Manufacturing Method

The compressor impeller 10 described above is manufactured with the fiber reinforced resin, using an injection molding machine including a fixed mold and a movable mold.

The injection molding machine includes a mold clamping device and a plasticizing device. The mold clamping device includes a fixed die plate to which the fixed mold is attached, and a movable die plate to that the movable mold is attached, moves the movable die plate by the operation of a hydraulic cylinder for mold opening and closing to firmly make the movable mold abut against the fixed mold to perform mold clamping. A cavity that is an air gap for molding the compressor impeller 10 is formed inside a mold consisting of the movable mold and the fixed mold.

The plasticizing device includes a tubular plasticizing cylinder, a screw provided inside the plasticizing cylinder, and a supply portion into which reinforced fibers and a resin raw material are charged. As the supply portion, a portion into which the reinforced fibers are charged, and a portion into which the resin raw material is charged can also be individually provided.

By rotating the screw, the resin raw material is melted, and the molten resin in which the reinforced fibers F are dispersed is injected toward the cavity inside the mold held by the mold clamping device.

Hereinafter, a mold 40 suitable to mold the compressor impeller 10 will be described with reference to FIG. 5. The mold 40 in the present embodiment has a feature in that directional cooling can be performed when injection-molding the compressor impeller 10. In addition, only main parts of the mold 40 are illustrated.

Figure 5:
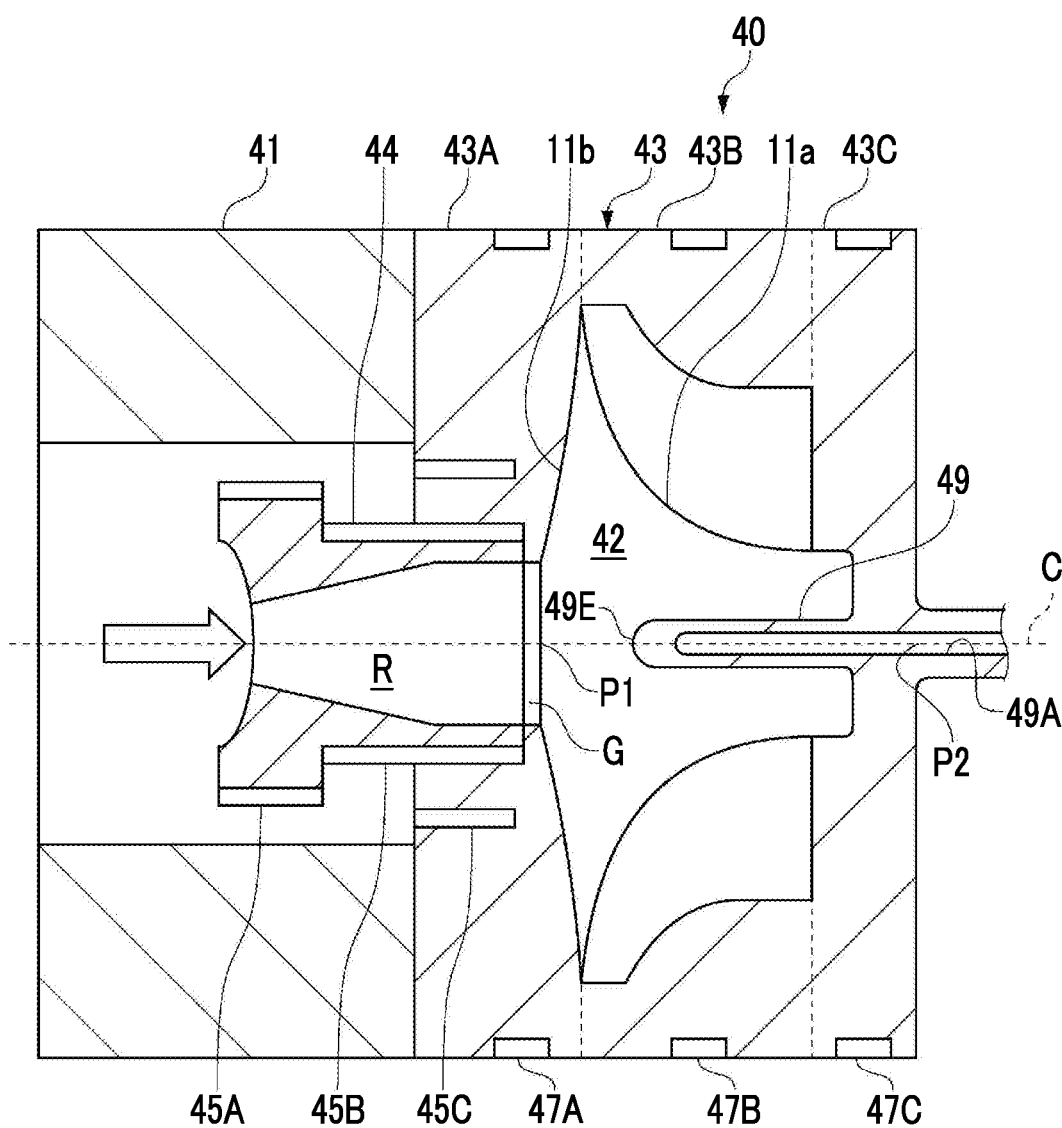
FIG. 5 is a longitudinal sectional view illustrating main parts of a mold clamping device that molds the impeller of the present embodiment.

As illustrated in FIG. 5, the mold 40 includes a fixed mold 41 attached to a fixed die plate (not illustrated), and a movable mold 43 attached to a movable die plate (not illustrated), and operates a hydraulic cylinder for mold opening and closing, thereby moving the movable die plate to firmly make the movable mold 43 abut against the fixed mold 41 to perform mold clamping. A cavity 42 that is an air gap for molding the compressor impeller 10 is formed between the movable mold 43 and the fixed mold 41. A sprue mold 44 that forms a sprue is attached to the movable mold 43, and the molten resin from the plasticizing device is supplied to the cavity 42 via the sprue mold 44. Additionally, the movable mold 43 can be split into a first element 43A, a second element 43B, and a third element 43C, as illustrated by dashed lines, according to the shape of the compressor impeller 10.

The sprue mold 44 assumes a cylindrical form, and has a first heater 45A and a second heater 45B provided along an outer periphery thereof. The first heater 45A and the second heater 45B are provided in order to maintain a required temperature, mainly, while the molten resin supplied from the plasticizing device passes through the sprue R.

Additionally, a third heater 45C is provided outside the second heater 45B inside the movable mold 43. The third heater 45C is inserted into an annular groove formed in the movable mold 43. The third heater 45C is provided, mainly, in order to set the temperature of the molten resin passing through a gate G leading to a cavity 42 to a required temperature.

As described above, the first heater 45A, the second heater 45B, and the third heater 45C are provided on an upstream side to which the molten resin is supplied. In addition, the constituent elements of the first heater 45A, the second heater 45B, and the third heater 45C are arbitrary, well-known heating methods, such as a heater including a heating wire as a heater element and making heated oil or pressurizing water flow through a temperature adjustment circuit installed within the mold, can be applied.

Next, the movable mold 43 includes a first cooling channel 47A, a second cooling channel 47B, and a third cooling channel 47B in the vicinity of an outer periphery thereof. The first cooling channel 47A, the second cooling channel 47B, and the third cooling channel 47C are provided in order to allow the cooling water supplied from a supply source (not illustrated) to circulate therethrough, thereby cooling the molten resin, which is supplied to the cavity 42, from the periphery thereof. In addition, the first cooling channel 47A, the second cooling channel 47B, and the third cooling channel 47C are provided in the first element 43A, the second element 43B, and the third element 43C, respectively, and allow the cooling water to flow therethrough, independently.

Additionally, in order to form the boss hole 12 in the compressor impeller 10, the center pin 49 is inserted into at a central part of the movable mold 43. Although the center pin 49 is inserted from the front surface 11a side, the tip 49E thereof is retracted from the back surface 11b side and stops inside the cavity 42, without passing through the cavity 42. The reason is as mentioned above.

A fourth cooling channel 49A is formed inside the center pin 49, and allows the cooling water supplied from the supply source (not illustrated) to circulate therethrough, thereby cooling the molten resin supplied to the cavity 42 from the center of the molten resin.

As described above, the movable mold 43 includes a mechanism that cools the cavity 42 from both an outer peripheral side and an inner peripheral side, and a cooling mechanism from the outer peripheral side includes a cooling mechanism that can perform cooling independently in the axial direction.

Next, a procedure of obtaining the compressor impeller 10 through the injection molding while performing the directional cooling will be described with reference to FIGS. 6 and 7A and 7B. Here, if a side where the sprue mold 44 is provided is defined as a gate (front surface) side P1 and its opposite side is defined as an opposite-gate (back surface) side P2, the directional cooling in the present embodiment means that a temperature gradient is provided such that temperature becomes low from the opposite-gate side P2 toward the gate side P1, in other words, a temperature gradient is provided such that temperature becomes high, from the gate side P1 toward the opposite-gate side P2. In order to realize this directional cooling, the operation of the first heater 45A, the second heater 45B, the third heater 45C and the first cooling channel 47A, the second cooling channel 47B, the third cooling channel 47C, and the fourth cooling channel 49A is controlled.

Figure 6:
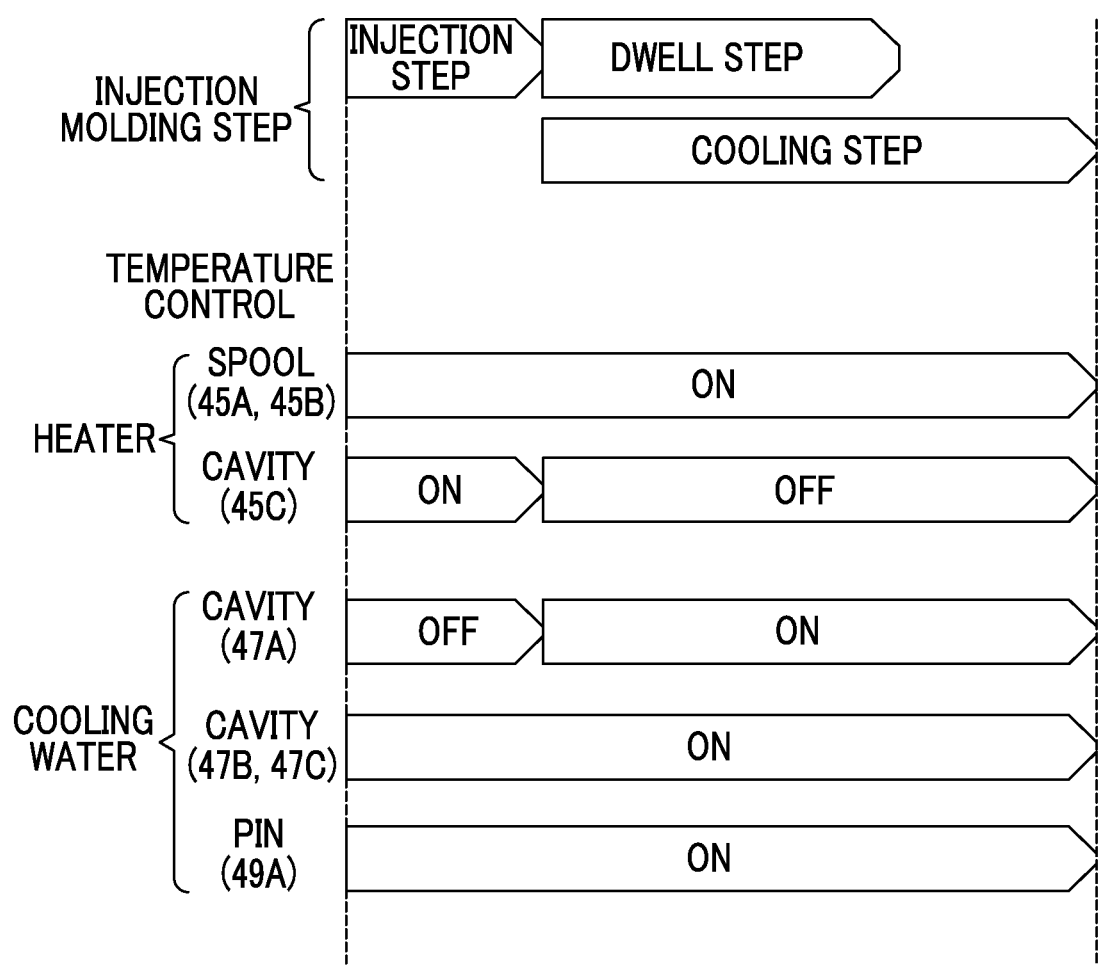
FIG. 6 is a timing chart illustrating a procedure of heating and cooling of a mold when the impeller of the present embodiment is molded using the mold of FIG. 5.

A series of steps of the injection molding, as illustrated in FIG. 6, include an injection step of filling the cavity 42 with the molten resin, and a dwell step of applying a required pressure to the molten resin within the cavity 42 after the cavity 42 is filled with the molten resin. Although the heating using the heaters and the cooling using the cooling water are controlled according to these steps, a step after the injection step can be referred to as a cooling step in which the injected molten resin is cooled.

Figure 7A:
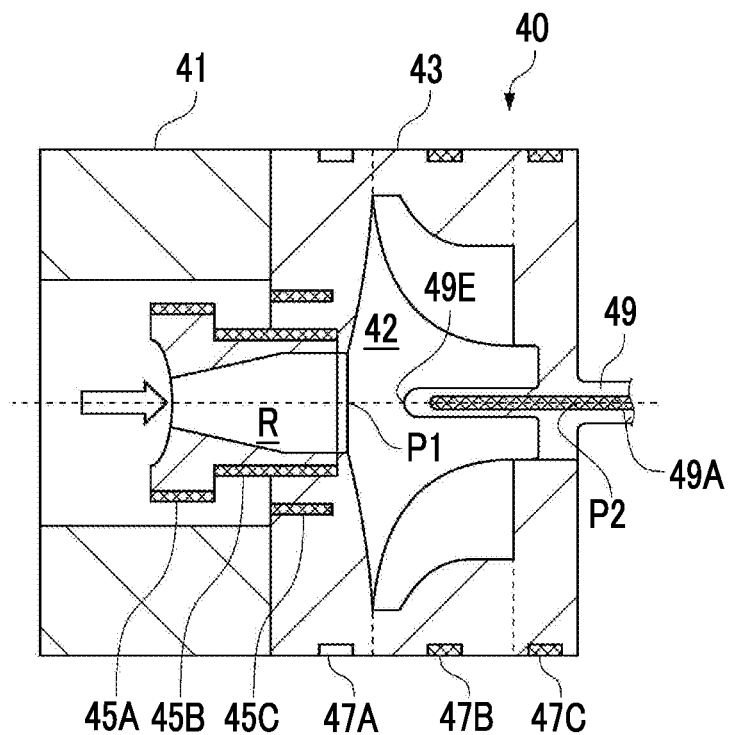
FIG. 7A is a view illustrating the procedure of heating of the mold when the impeller of the present embodiment is molded using the mold of FIG. 5.

In the injection step, as illustrated in FIGS. 6 and 7A, all of the first heater 45A, the second heater 45B, and the third heater 45C are brought into a heating state (ON in FIG. 6). Meanwhile, the cooling water are made to circulate through the second cooling channel 47B, the third cooling channel 47C, and the fourth cooling channel 49A except for the first cooling channel 47A (ON in FIG. 6). In this way, in the injection step, the temperature of a region of the cavity 42 near the gate side P1 is kept high. In addition, in FIG. 7A and FIG. 7B, heaters in the heating state are shaded, and heaters that are not in the heating state are illustrated by outlines. Similarly, cooling channels through which the cooling water is circulated are shaded, and cooling channels through which the cooling water is not circulated are illustrated by outlines.

Figure 7B:
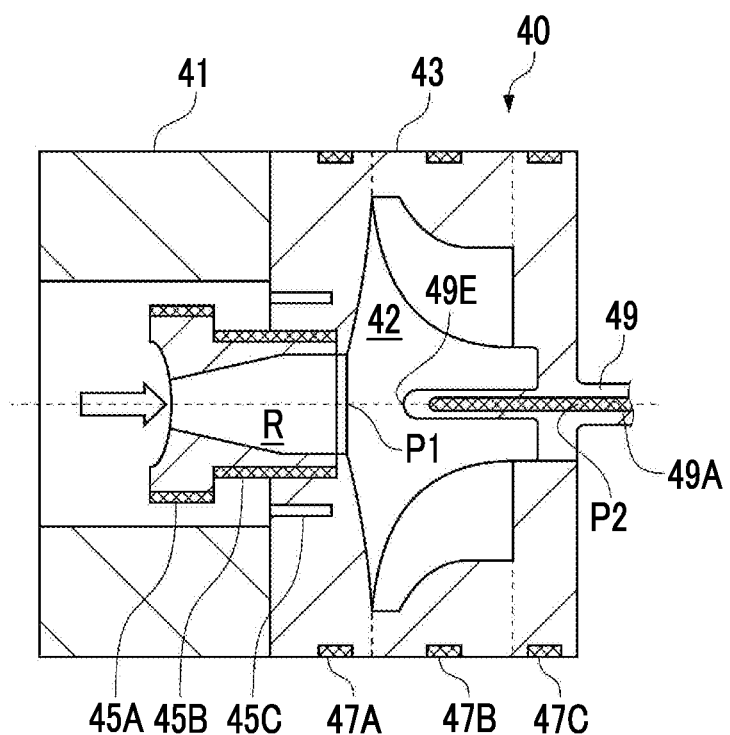
FIG. 7B is a view illustrating the procedure of cooling of the mold when the impeller of the present embodiment is molded using the mold of FIG. 5.

Next, if transition from the injection step to the dwell step is made, as illustrated in FIGS. 6 and 7B, heating using the third heater 45C is stopped (OFF in FIG. 6), and the cooling water is also circulated through the first cooling channel 47A (ON in FIG. 6). Accordingly, a region where temperature is maintained in the injection step starts to be cooled. The cooling step is completed by continuing this state for a predetermined time after the dwell step is completed. After that, the compressor impeller 10 is taken out by performing mold opening.

Next, effects according to the above procedure will be described.

By controlling the heating using the heaters, and the cooling using the cooling water to give the temperature gradients, the molten resin is cooled from the opposite-gate side P2, and shrinkage accompanying a decrease in the temperature of the molten resin is caused in the opposite-gate side P2. Meanwhile, by heating and dwelling the gate side P1, the molten resin can be replenished from the gate side P1 so as to correspond to the amount of shrinkage on the opposite-gate side P2, and therefore the occurrence of internal tensile residual stress and cracks due to the shrinkage can be prevented.

Next, by circulating the cooling water also through the first cooling channel 47A from the time when the injection step being completed after the filling of the molten resin is completed, cooling proceeds from the external diameter side of the cavity 42 toward the center side in the radial direction of the compressor impeller 10 in addition to the cooling in the axial direction from the opposite-gate side P2 to the gate side P1. Hence, according to the present embodiment, even against the shrinkage of the molten resin in the radial direction, the molten resin can be replenished from the gate side P1 so as to correspond to the amount of shrinkage.

Thus, the occurrence of internal tensile residual stress and cracks due to the shrinkage can be prevented. Additionally, by allowing the cooling water to flow to the first cooling channel 47A with a time lag and starting the cooling of the gate G and its vicinity region, it is possible to advance the cooling and solidification of the resin immediately below the gate G, and expel a final cooling and solidification position to the inside of the gate G, and the occurrence of tensile residual stress of a thick portion and the occurrences of cracks can be prevented.

Additionally, by performing the directional cooling, the surface roughness of the back surface 11b is small if the front surface 11a of the hub 11 cooled at the beginning is compared with the back surface 11b heated at the beginning. In the injection molding, it is known that, in a case where the molten resin is injected into a state where mold temperature is high, the transfer performance of a resin molded product of a mold wall surface is improved, and the surface smoothness of a molded product is markedly improved in a mold that finished into a smooth mirror plane. Therefore, in the present embodiment, the surface smoothness of the back surface 11b is improved by performing the injection molding in a state where the mold on the back surface 11b side is kept at high temperature. This suggests that, when the compressor impeller 10 is rotated, generation of heat resulting from friction with air can be suppressed. Particularly, since the back surface 11b side is assembled to a fixed surface of a bearing housing with a minute gap in order to prevent leakage of compressed air, and is rotated at high speed, temperature is apt to rise due to the frictional heat generation of air compared to the front surface 11a. Hence, this heat generation is also effectively reduced by performing the directional cooling according to the present embodiment.

Figure 8:
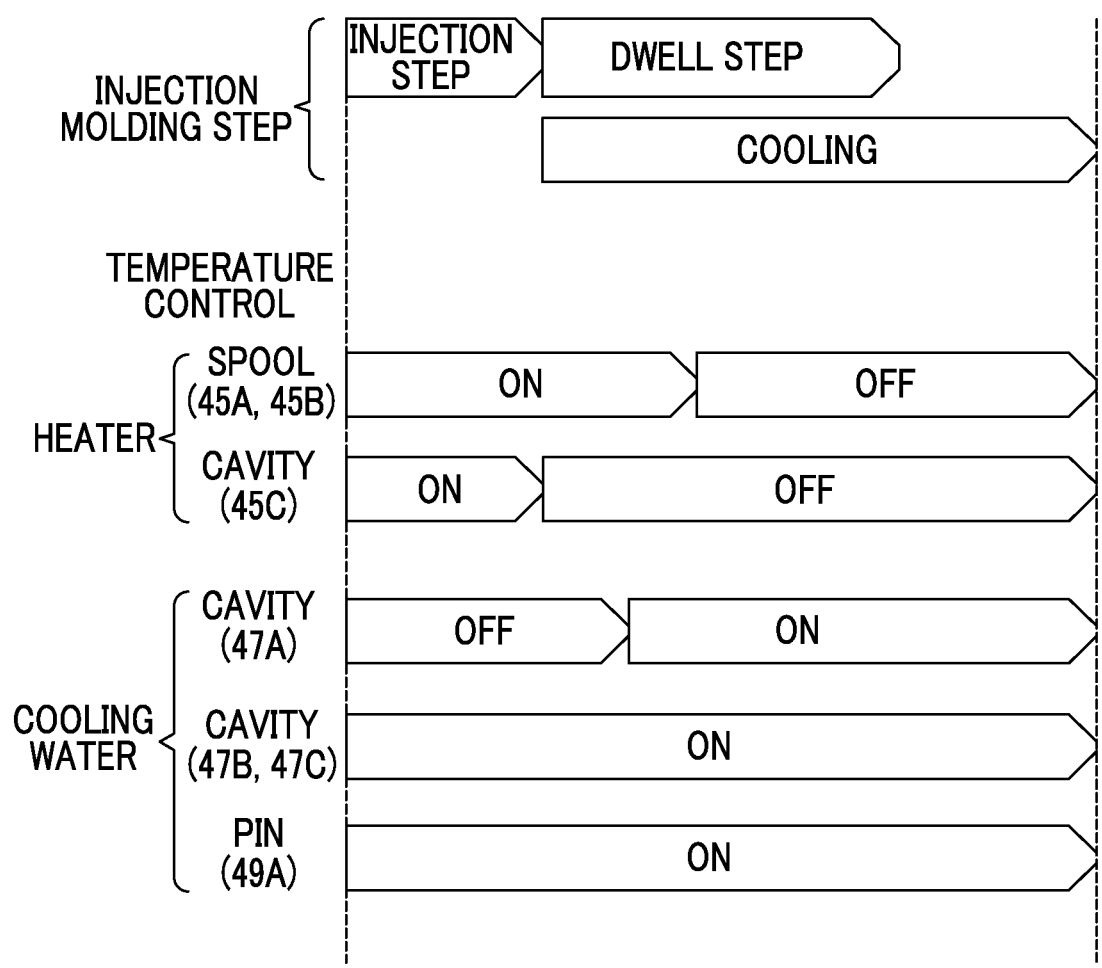
FIG. 8 is a view illustrating a modification example of FIG. 6.

In the present embodiment, the conditions of the heating using the heaters and the cooling using the cooling water can also be changed as illustrated in FIG. 8.

According to the conditions illustrated in FIG. 8, injection pressure is kept (dwell step) until the cooling water is allowed to flow to the first cooling channel 47A and the cooling of the gate G is started, so that the molten resin can be sequentially pushed from the gate side P1 so as to correspond to the amount of shrinkage of a molded product. Then, replenishment of the molten resin against the shrinkage, the occurrence of stress and cracks at a final cooling and solidification position of a product part immediately below the gate G can be prevented.

In the present embodiment, although the injection pressure in the dwell step is arbitrary, dwelling is preferably performed at 140 MPa or more, and more preferably at 200 MPa or more. Then, the replenishment performance of viscous molten resin and the amount of compression of the molten resin can be secured, the amount of expansion enough to compensate for cooling solidification shrinkage can be secured, and this is effective in prevention of tensile residual stress and cracks.

Additionally, in the dwell step, it is preferable that keeping of the resin temperature in the vicinity of the gate is continued in a temperature zone between a melting point and a glass transition temperature of the resin. Accordingly, since it is sufficient if the dwelling only in the temperature zone where resin flow is possible, the power of the dwelling of an injection shaft becomes a requisite minimum, which contributes to energy saving.

Although the preferred embodiment of the invention has been described above, the configurations mentioned in the aforementioned embodiment can be selected or can be appropriately changed to other configurations unless these depart from the spirit of the invention.

For example, the inclination orientation of the reinforced fibers F can be applied not only to the impeller including two type of blades of the long blade and the short blade but also to an impeller including only one typed of blade.

Additionally, although the impeller has been described above taking the compressor impeller 10 as an example, the invention can be applied to turbine impellers and other impellers.

Figure 9:
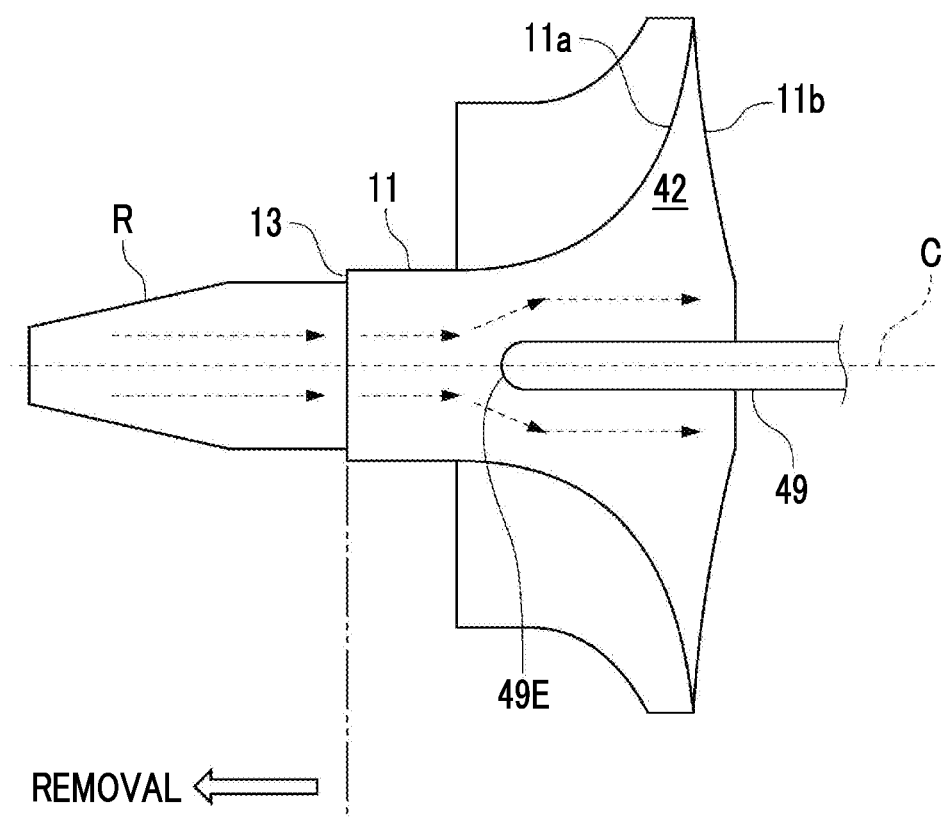
FIG. 9 is a view illustrating a modification example of FIG. 6.

Moreover, an example in which the gate G is provided on the back surface 11b side of the compressor impeller 10, while the front surface 11a is set as the opposite-gate side has been shown in the embodiment described above. The invention method is not limited to an injection direction (first direction). As illustrated in FIG. 9, the gate G may be provided on the front surface 11a side of the compressor impeller 10, while the injection direction (a second direction, a dashed line arrow) having the back surface 11b as the opposite-gate side may be set. Even in a case where the molten resin is injection-molded in this second direction, the same effects as above are obtained by the center pin 49 for cooling. That is, it is preferable that the center pin 49 is inserted from the back surface 11b side, and the tip thereof is arranged to be retracted from the front surface 11a side of the boss 13 to the back surface 11b side.

REFERENCE SIGNS LIST

1: Turbocharger
10: Compressor Impeller
11: HUB
11a: Front Surface
11b: Back Surface
12: Boss Hole
13: Boss
15: Compressor Blade
15a: Long Blade
15b: Short Blade
17: Turbine Impeller
18: Turbine Blade
19: Shaft
20: Compressor Housing
21: Intake Port
22: Discharge Port
23: Compressor Passage
30: Turbine Housing
31: Discharge Port
32: Introduction Inlet
33: Scroll Passage
40: Mold
41: Fixed Mold
42: Cavity
43: Movable Mold
43A: First Element
43B: Second Element
43C: Third Element
44: Sprue Mold
45A: First Heater
45B: Second Heater
45C: Third Heater
47A: First Cooling Channel
47B: Second Cooling Channel
47C: Third Cooling Channel
49: Center Pin
49A: Fourth Cooling Channel
49E: Tip C: Rotational Axis
S$_P$: Principal Stress
α: First Region
β: Second Region

The invention claimed is:

1. A method for manufacturing an impeller by performing injection-molding into a cavity of a mold, the impeller including a hub having a front side and a back side and having a boss with a boss hole formed along a rotational axis of the impeller, and a plurality of blades provided on the front side of the hub and being made of a resin having reinforced fibers dispersed therein, the method comprising:
    an injection step of filling the cavity with a molten resin containing the reinforced fibers, in a direction of the rotational axis and from a gate side into which the molten resin flows, toward an opposite-gate side opposite to the gate side; and
    a dwell step of applying required pressure to the filled molten resin,
    wherein, in the injection step and the dwell step, directional cooling is performed with a temperature gradient such that the temperature becomes relatively lower from the gate side toward the opposite-gate side,
    wherein an additional cooling of the gate side from an external diameter side of the cavity toward a center of the cavity in a radial direction of the impeller and a vicinity region thereof is performed from a time when the injection step is completed or after the injection step is completed,
    wherein the dwell step is maintained when the additional cooling of the gate side is being performed, and
    the directional cooling and the additional cooling are maintained after the dwell step is terminated.

2. The method for manufacturing an impeller according to claim 1,
    wherein, in the injection step,
    the directional cooling is performed by heating an inflow passage of the molten resin leading to the cavity, and a gate of the cavity, and its vicinity region from peripheries thereof, while cooling the cavity from a periphery thereof.

3. The method for manufacturing an impeller according to claim 2,
    wherein, in the dwell step, the gate of the heated cavity and its vicinity region are cooled.

4. The method for manufacturing an impeller according to claim 3,
    wherein keeping of injection pressure is performed until the cooling of the gate is started.

5. The method for manufacturing an impeller according to claim 1,
    wherein, in the dwell step, keeping of the temperature of the molten resin in the vicinity of a gate is continued in a temperature zone between a melting point and a glass transition temperature of the resin.

6. The method for manufacturing an impeller according to claim 1,
    wherein keeping of injection pressure in the dwell step is performed at 140 MPa or more.

7. The method for manufacturing an impeller according to claim 1, further comprising:
    a pin having a cooling passage through which cooling water is circulated, and
    wherein the pin is inserted into a location corresponding to the boss hole and an additional cooling of the molten resin is performed from an inside of the cavity by circulating the cooling water in the cooling passage.

8. The method for manufacturing an impeller according to claim 7,
    wherein the molten resin is injected in a first direction directed from the back side to the front side or in a second direction directed from the front side to the back side,
    wherein the pin is inserted from the front side and a tip thereof is arranged to be retracted from the back side of the boss to the front side thereof, in a case where the molten resin is injected in the first direction,
    wherein the pin is inserted from the back side and the tip thereof is arranged to be retracted from the front side of the boss to the back side thereof, in a case where the molten resin is injected in the second direction.

9. The method for manufacturing an impeller according to claim 2,
    wherein, in the dwell step, keeping of the temperature of the molten resin in the vicinity of the gate is continued in a temperature zone between a melting point and a glass transition temperature of the resin.

10. The method for manufacturing an impeller according to claim 3,
    wherein, in the dwell step, keeping of the temperature of the molten resin in the vicinity of the gate is continued in a temperature zone between a melting point and a glass transition temperature of the resin.

11. The method for manufacturing an impeller according to claim 4,
    wherein, in the dwell step, keeping of the temperature of the molten resin in the vicinity of the gate is continued in a temperature zone between a melting point and a glass transition temperature of the resin.

12. The method for manufacturing an impeller according to claim 2,
    wherein keeping of injection pressure in the dwell step is performed at 140 MPa or more.

13. The method for manufacturing an impeller according to claim 3,
    wherein keeping of injection pressure in the dwell step is performed at 140 MPa or more.

14. The method for manufacturing an impeller according to claim 4,
    wherein keeping of injection pressure in the dwell step is performed at 140 MPa or more.

15. The method for manufacturing an impeller according to claim 5,
    wherein keeping of injection pressure in the dwell step is performed at 140 MPa or more.

16. The method for manufacturing an impeller according to claim 2, further comprising:
    a pin having a cooling passage through which cooling water is circulated, and
    wherein the pin is inserted into a location corresponding to the boss hole and an additional cooling of the molten resin is performed from an inside of the cavity by circulating the cooling water in the cooling passage.

17. The method for manufacturing an impeller according to claim 3, further comprising:
    a pin having a cooling passage through which cooling water is circulated, and
    wherein the pin is inserted into a location corresponding to the boss hole and an additional cooling of the molten resin is performed from an inside of the cavity by circulating the cooling water in the cooling passage.

18. The method for manufacturing an impeller according to claim 4, further comprising:

a pin having a cooling passage through which cooling water is circulated, and wherein the pin is inserted into a location corresponding to the boss hole and an additional cooling of the molten resin is performed from an inside of the cavity by circulating the cooling water in the cooling passage.

19. The method for manufacturing an impeller according to claim 5, further comprising:

a pin having a cooling passage through which cooling water is circulated, and wherein the pin is inserted into a location corresponding to the boss hole and an additional cooling of the molten resin is performed from an inside of the cavity by circulating the cooling water in the cooling passage.

20. The method for manufacturing an impeller according to claim 6, further comprising:

a pin having a cooling passage through which cooling water is circulated, and wherein the pin is inserted into a location corresponding to the boss hole and an additional cooling of the molten resin is performed from an inside of the cavity by circulating the cooling water in the cooling passage.

\* \* \* \* \*